Oct. 29, 1963 P. G. DE SEE 3,108,610
TWO-WAY RELIEF VALVE
Filed Sept. 21, 1961 2 Sheets-Sheet 1

INVENTOR.
PETER G. DeSEE
BY *Alfred W. Vibber*
ATTORNEY

Oct. 29, 1963  P. G. DE SEE  3,108,610
TWO-WAY RELIEF VALVE
Filed Sept. 21, 1961  2 Sheets-Sheet 2
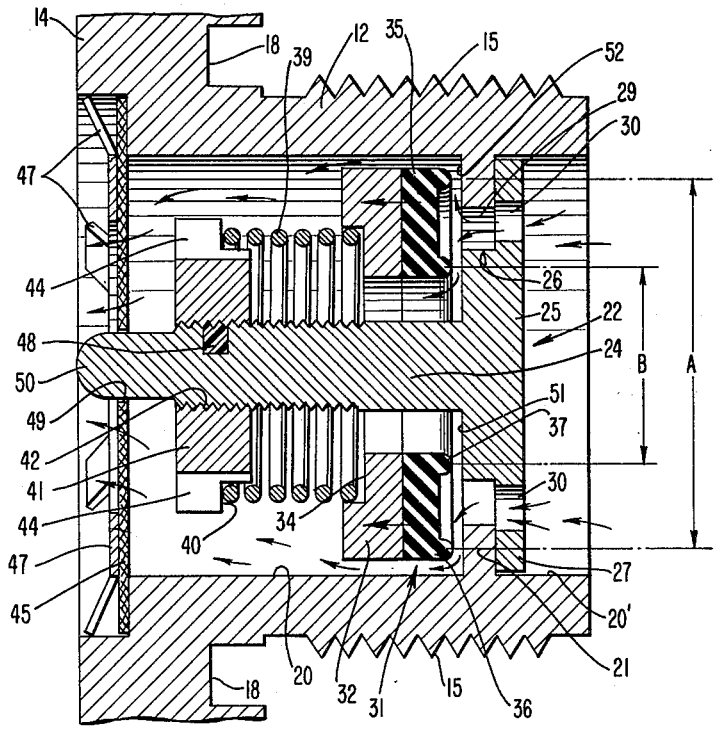
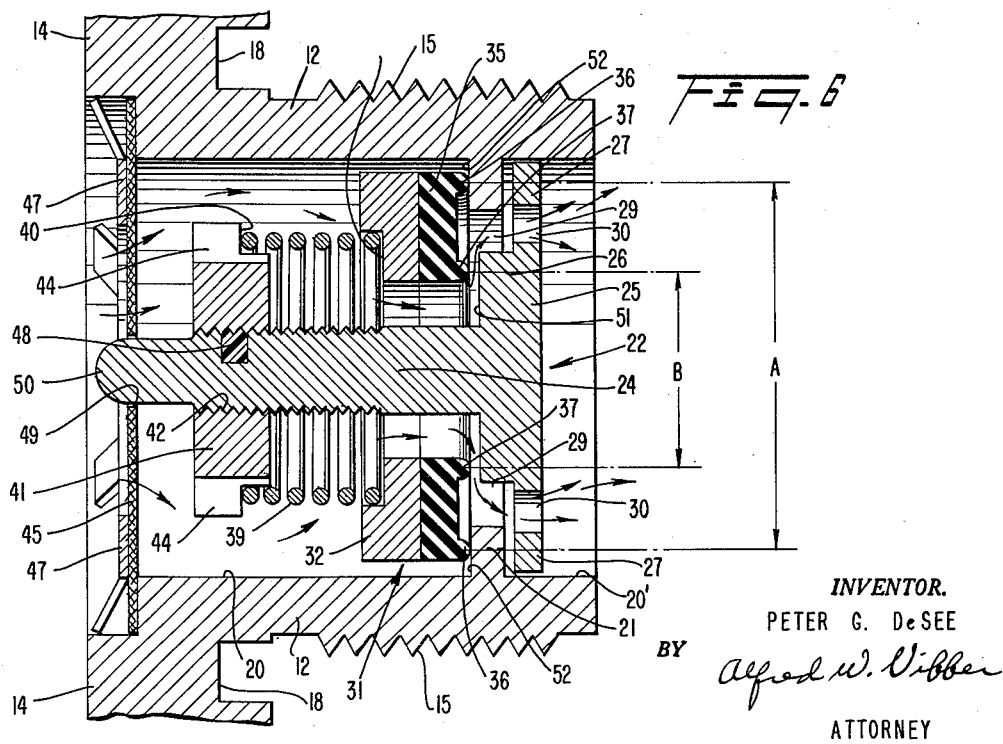
INVENTOR.
PETER G. De SEE
BY Alfred W. Vibber
ATTORNEY

Patent 3,108,610 — Two-Way Relief Valve

3,108,610
TWO-WAY RELIEF VALVE
Peter G. De See, Hawthorne, N.J., assignor to Halkey-Roberts Corporation, Paramus, N.J., a corporation of New Jersey
Filed Sept. 21, 1961, Ser. No. 139,635
7 Claims. (Cl. 137—493)

This invention relates to a two-way relief valve, and more particularly relates to a valve for relieving fluid pressure therethrough when the pressure on either side of the valve reaches a predetermined value.

The valve of the invention will be described primarily in connection with its employment on enclosures which are, in the course of their use, subjected to pressures which vary from atmospheric pressure. Typical of such enclosures are sealed protective plastic or metal cases or containers in which electronic equipment is installed, such equipment being carried by a vehicle. During travel of the vehicle the relative pressures within and outside the containers ordinarily change substantially. When opening such a container with a negative pressure differential, that is, with the interior of the container at a lower pressure than the exterior of the container, great difficulty would be experienced in pulling off the cover of the container unless the internal and external pressures were nearly equalized.

The preferred embodiment of two-way relief valve shown is admirably suited for use with containers such as those referred to above. The valve is of such construction that it may be made to open automatically upon the establishment of a pressure differential in either direction which exceeds a predetermined differential, whereby to bring the internal pressure of the container back to a condition in which it differs from the external pressure by a predetermined amount. In addition, the valve is preferably provided with means for opening the valve manually, so that, when desired, the internal and external pressures can be equalized.

It is to be understood that the above-suggested manner of use of the valve of the invention is merely illustrative, and is not limiting. The valve is obviously useful in a variety of hydraulic or pneumatic systems wherein it is desired to maintain a predetermined pressure differential between two parts of the system.

The invention has among its objects the provision of an improved two-way fluid pressure relief valve.

A further object of the invention lies in the provision of a valve of the type indicated which is of simplified construction, and which is economical to manufacture and maintain.

Another object of the invention lies in the provision of a two-way fluid pressure-relief valve which is adjustable as to the pressure at which the valve operates.

Yet another object of the invention resides in the provision of a two-way fluid pressure-relief valve which functions at different pressures in opposite directions, the ratio between such pressures being predetermined and being maintained despite adjustment of the valve.

A still further object of the invention lies in the provision of a valve of the type indicated which is compact and which occupies a relatively small space both within and outside a container with which it may be employed.

Still other objects of the invention reside in the provision of a two-way fluid pressure-relief valve which is protected against the entry of foreign matter into the valve, which permits a simplified testing procedure to determine the proper adjustment of the valve, and which provides for the manual operation of the valve, if desired, to equalize the pressure operative at both ends of the valve.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in front elevation of a preferred illustrative embodiment of valve in accordance with the invention, the valve being illustrated mounted on a fragmentarily shown panel, such as the wall of a container;

FIG. 5 is an enlarged view in vertical axial section through the valve per se, the parts of the valve being shown in the position they assume during the equalization of a higher pressure in communicating with the right-hand, inner end of the valve and a lower pressure in communication with the outer end of the valve; and FIG. 6 is a view similar to FIG. 5 but with the parts of the valve in positions which they assume during the equalization of a higher pressure in communication with the left-hand, outer end of the valve and a lower pressure in communication with the inner end of the valve.

Figure 1:
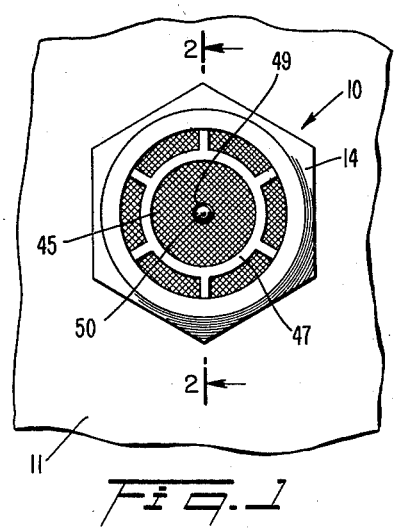
Figure 3:
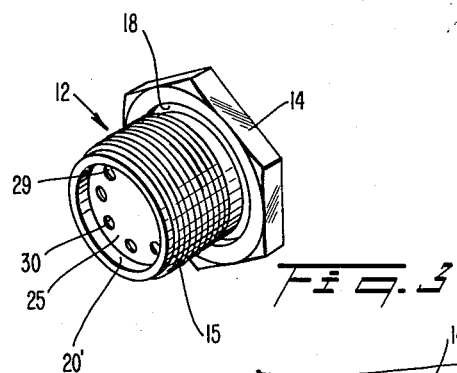
FIG. 3 is a view in perspective of the valve proper, the view being taken from the rear or inner end of the valve, the valve-retaining nut and sealing ring shown associated with the valve body in FIG. 2 being omitted.
Figure 2:
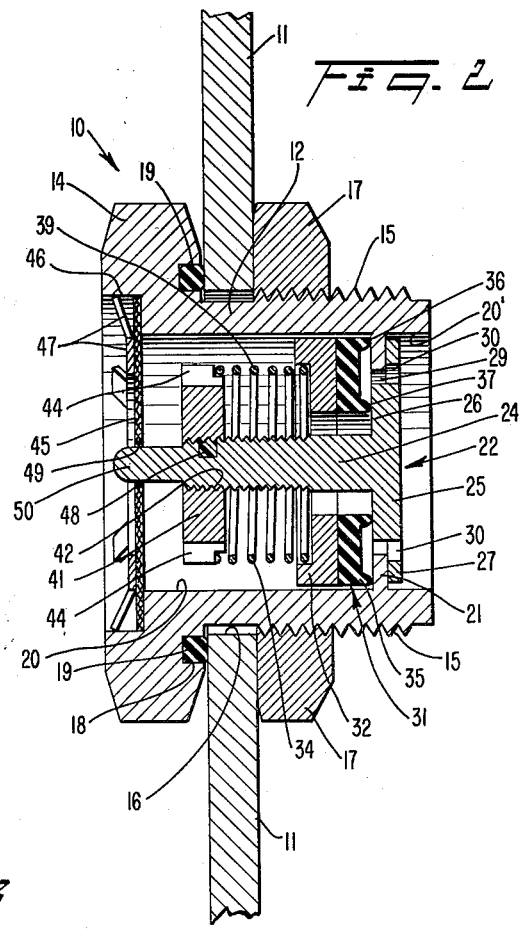
FIG. 2 is a view in vertical axial section through the valve and panel, the section being taken along the line 2—2 of FIG. 1.

The embodiment of valve shown herein is generally designated by the reference character 10. Such valve is shown affixed and sealed to a panel 11 which may be, for example, a part of a metal case for the protection of electronic equipment. The space to the right of panel 11 in FIG. 2 is thus the sealed space within the case, whereas the space to the left of panel 11 is in free communication with the atmosphere.

Valve 10 has a main body portion 12 which is of generally circular cylindrical shape. Integral with body 12 is an outwardly directed flange 14. The inner end of body 12 is threaded as shown at 15. The valve body is mounted on panel 11 by being passed inwardly through a hole 16 in the panel, a nut 17 disposed on threaded portion 15 of body 12 drawing the body forcibly inwardly. Sealing between body 12 of the valve and the panel is effected by a rubber-like O-ring 19 which is positioned in an annular seat 18 on the inner side of flange 14, the O-ring being drawn forcibly against the panel by nut 17.

Body 12 of the valve is provided with a circular cylindrical bore 20 therein which is coaxial of the valve body. Spaced inwardly somewhat from the inner end of the valve body there is an inwardly extending annular flange 21 which, in the embodiment shown, is integral with body 12. Outwardly of flange 21 the bore in the body is continued at 20'. Positioned coaxially of bores 20, 20', is an axially reciprocable valve member generally designated 22. Valve member 22 has an axially extending stem, generally designated 24, the inner end of the stem being provided with a transverse disc-like head 25. Head 25 has an axially thicker circular radially inner portion 26 and an outer thinner annular portion 27 integral therewith. When valve member 22 is disposed in the valve-closed position of FIG. 2, the forward transverse annular surface of portion 27 of the valve member abuts the axially outer transverse surface of flange 21 on the valve body. Portion 27 of the valve member 22 and flange 21 thus form means to stop the travel of valve member 22 in the direction to the left in FIG. 2.

The inner thicker portion 26 of head 25 of the valve member has the peripheral surface thereof spaced somewhat inwardly of the inner peripheral surface of flange 21 to provide an annular space 29 therebetween. A plurality of holes (eight indicated) 30 through the outer thinner part 27 of head 25 communicate with the annular space 29, as shown. Thus the atmosphere within the container, to the right of the valve as shown in FIG. 2, is in constant communication with the space within the valve lying to the left of flange 21.

A second, annular valve element generally designated 31 is positioned within bore 20 of the valve body, as shown. Valve element 31, which has an outer diameter at least slightly less than the diameter of bore 20, selectively reciprocates within the bore from the valve-closed position of FIG. 2 to a position such as that shown in FIG. 5. Valve element 31 has a rigid annular base portion 32, made, for example, of aluminum, and an annular resilient rubber-like member 35 which is secured to element 32 as by being adhered thereto. Member 35 has a radially outer axially inwardly facing bead 36 thereon, and a second, radially inwardly disposed, axially inwardly facing bead 37 thereon. When the valve is in the closed position of FIG. 2, bead 36 sealingly cooperates with the axially outer transverse surface 52 of flange 21, and bead 37 sealingly cooperates with the axially forward surface 51 of portion 26 of head 25.

Valve element 22 and annular valve member 31 are constantly urged toward the valve-closed position of FIG. 2 by a coil compression spring 39 which is telescoped about stem 24 of valve element 22. The axially inner end of spring 39 is received within an annular spring seat 34 in the forward end of member 32. The axially outer end of spring 39 is received within an annular spring seat 40 on a nut 41 which is threadedly engaged with a threaded portion 42 on stem 24. It will be seen that the force with which beads 36 and 37 engage surfaces 52 and 51, respectively, may be varied by adjusting the position of nut 41 longitudinally of stem 24.

Figure 4:
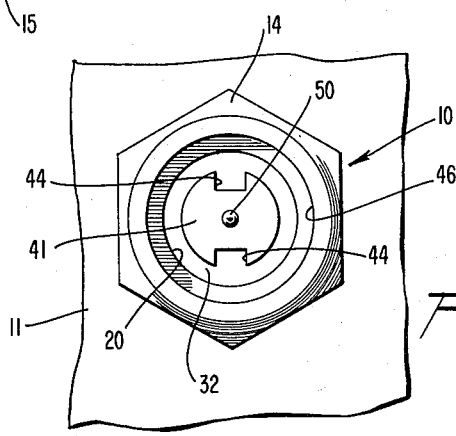
FIG. 4 is a view in front elevation of the valve and panel similar to FIG. 1, the protective screen and retaining ring therefor being shown removed as during the adjusting of the valve to change the pressure at which the valve operates.

To facilitate such adjustment, the outer or forward face of nut 41 is preferably provided with opposed slots 44 therethrough. Such slots may be engaged by a suitable spanner when nut 41 is exposed as shown in FIG. 4. Slots 44 also provide paths of flow of air past nut 41 even though the spring 39 should momentarily be fully compressed with the turns thereof in tight engagement. To protect the valve 10 against the ingress of foreign material, the valve is preferably provided with a screen 45 which is disposed across the axially outer end of bore 20. In the embodiment shown, the outer end of body 12 is provided with an annular seat 46 surrounding bore 20. Screen 45 is disposed with its edges in such seat, and is retained therein by a spring ring having a plurality of radially directed arms which forcibly engage the seat when the ring is pressed rearwardly thereinto. To retain the nut 41 firmly in adjusted position, the stem 24 is preferably provided with a resiliently deformable plug 48, made, for example, of nylon, which is disposed in a radial passage in stem 24, as shown. Such plug, which may be of the type sold under the trademark "Nylok," forcibly resiliently engages the threads on the nut 41 and is deformed thereby, thereby retaining the nut against fortuitous displacement with respect to the stem.

The valve of the invention is preferably provided with a means whereby it may be manually operated to equalize the pressures existing on the two sides of the valve. This may be of advantage, for example, as when a reduced pressure exists within the container and it is desired to remove the lid of the container. To permit manual operation of the valve, the stem 24 of valve element 22 is extended into a rounded nose portion 50 which protrudes forwardly through a central opening 49 in screen 45. When such nose portion 50 engages hole 49 substantially accurately, such engagement of the parts also provides a further desirable guiding of valve member 22 in its axial reciprocation.

As above explained, the valve is shown in closed position in FIG. 2. In FIG. 5 the valve is shown open so that air will go in the direction from right to left therethrough, as in relieving an unduly high pressure existing within the container to which the valve is affixed. In FIG. 6 the valve is shown open to allow air to flow in a direction from left to right therethrough, as in relieving an unduly low pressure existing within the container.

In FIG. 5 the valve member 22 remains with portion 27 thereof in abutment with flange 21. The annular valve member 31, however, has shifted somewhat to the left so as to withdraw beads 36 and 37 from sealing engagement with surface 52 on flange 21 and surface 51 on the head 25 of valve member 22. Consequently, air is free to flow through the valve in the paths shown by the curved arrows. Thus air flows in the direction from right to left, that is, from the interior of the container to the atmosphere, through holes 30 in the head of valve member 22, through the annular space 29, and thence through the central opening in valve member 31 and also through the annular space between the periphery of valve member 31 and the surface of bore 20. The valve member 31 remains in the position shown in FIG. 5 until a predetermined ratio of pressures inside and outside the container has been reached, following which the spring 39 thrust the valve member 31 into the valve-closed position of FIG. 2.

In FIG. 6, an excessive pressure outside the container with respect to that inside the container has caused the valve member 22 to be shifted somewhat to the right, thereby removing portion 27 thereof from contact with flange 21. The valve member 31, however, remains in the same position which it has in the valve-closed position of FIG. 2, with bead 36 in sealing engagement with the axially outer surface 52 of flange 21. As a result of such movement of valve member 22, the surface 51 of central portion 26 of valve member 22 is spaced from bead 37 of valve member 31, thereby providing an open path through the valve in the direction from the outside to the inside of the container so that air is free to flow through the valve in the direction of the curved arrows in FIG. 6. The valve remains in the position shown in FIG. 6 until the ratio between the pressure existing within the container and that existing outside the container has reached a predetermined value. When such ratio of pressures is attained, the spring 39 thrusts the valve member 22 into the valve-closed position of FIG. 2.

As indicated in FIGS. 5 and 6, the outer sealing bead 36 of valve member 31 has an effective diameter A, and the inner bead 37 of such valve member has an effective diameter B. The atmosphere within the container is at all times in free communication with the annular surface of valve member 31 which lies between the effective sealing portions of beads 36 and 37. Such annular surface has an area which is the difference between the area of a circle having a diameter A and a circle having a diameter B. The axially forward portion of valve member 22 radially inwardly of bead 37 is at all times in free communication with the atmosphere. The portion of valve member 22 thus subjected to atmospheric pressure has an area equal to that of a circle with a diameter B. It can thus be seen that the ratio of the pressures which the valve of the invention will automatically maintain inside and outside the container is determined by the relative values of A and B, since the same spring 39 urges valve elements 22 and 31 toward their valve-closed positions, and thus must be overcome if the valve is to be opened in either the manner shown in FIG. 5 or that shown in FIG. 6.

The air pressure differential at which the valve will operate in the two directions described can readily be varied by turning nut 41 on stem 24 in the required direction. This can readily be done, if necessary, after the valve is in service by removing the spring retainer 47 and the screen 45, and inserting a spanner into the slots 44 of nut 41 while holding stem 24 to prevent turning of the latter.

Because with a given design of valve, in which the values A and B are fixed, the valve-operating pressure ratio is fixed, it is necessary to test the valve under pressure in one direction only to ascertain that the valve will operate in both directions at predetermined pressure differentials. Further, any defect in sealing of the valve at either of beads 36 and 37 may be found from a single test in either direction, since, in the disclosed embodiment, both sealing beads are employed to close the paths through the valve when the valve is in the valve-closed position.

It will be seen from the above that the valve of the invention is particularly characterized by its simplicity, its small size, and by its flow capacity. The preferred embodiment of valve utilizes only one spring, an annular valve member, and a stemmed valve member, thereby holding the number of parts to a minimum. Such simplicity of design and small number of parts of the valve reduce the possibility of valve malfunction. Because of the free-floating mounting of the annular valve element 31, the seats 36 and 37 on such element can readily simultaneously sealingly engage surfaces 52 and 51 on flanges 21 and 26, respectively.

Although only one embodiment of the invention has been illustrated in the accompanying drawings and described in the foregoing specification, it is to be especially understood that various changes such as in the relative dimensions of the parts, materials used, and the like, as well as the suggested manner of use of the apparatus of the invention, may be made therein without departing from the spirit and scope of the invention as will now be apparent to those skilled in the art. Thus the valve, in certain applications thereof, will be turned around, that is, the "outer end" of the valve as here shown will be the inner end in such applications. Further, the valve need not be employed to equalize atmospheric pressure, but may, for example, be installed in a conduit to function as a two-way pressure relief or semi-check valve.

What is claimed is:

1. A two-way fluid pressure relief valve, comprising a hollow valve body having a passage therethrough, a first, annular valve member disposed transversely of, and reciprocable longitudinally in, the passage, a first, outer annular seat, facing a first end of the valve body, on a first side of the first valve member, means on the body providing a second, annular seat longitudinally aligned with the first seat, facing the second, opposite end of the body and projecting inwardly of the wall of the passage and generally transversely of such passage in position to be abutted by and sealingly to cooperate with the first seat when the first, annular valve member is thrust in a first direction, toward the first end of the body, thereagainst, a third, inner annular seat, concentric with the first and second seats, on the first side of the annular valve member and spaced radially inwardly of the second seat, a second, disc-like valve member disposed transversely of, and reciprocable longitudinally in, the passage, said second valve member having a fourth, annular seat on its second side overlying and confronting the third seat and sealingly cooperating therewith when the second valve member is thrust against the third seat in a second direction, opposite to said first direction and toward the second end of the body, means guiding the first and second valve members for reciprocation in the passage, a central stem affixed to the second valve member and slidably projecting through a central passage in the means on the body providing the first annular seat and through a central passage through the first valve member, an abutment mounted for longitudinal adjustment on the stem, a resilient sleeve-like means telescoped over the stem and compressively received beyond the first valve member and the abutment, said resilient means constantly yieldingly urging the first valve member in said first direction and the second valve member in the second direction, whereby the set of valve seats consisting of the first and second seats is normally held in sealing engagement and the set of valve seats consisting of the third and fourth seats is normally held in sealing engagement with the second valve member in a predetermined position longitudinally of the passage, the said valve members and seats sealingly closing the passage when both of the cooperating sets of said seats are in sealing engagement and opening the passage when either of the two sets of normally engaging seats is open, and stop means for preventing travel of the second valve member past said predetermined position in the second direction, means continuously providing communication between the space within one end of the valve body with one side of the valve formed by the third and fourth seats, and means continuously providing communication between the space within the other end of the valve body with the other side of the valve formed by the third and fourth seats, the abutment being free from contact at all times with any fixed part of the valve body and the first valve member, and the stem being free at all times from contact with any fixed part of the valve body.

2. A two-way relief valve, comprising a housing in the form of a sleeve having a central passage therethrough, the housing including a transverse annular flange, the flange having a central passage therethrough projecting generally radially inwardly therefrom, the flange having first and second sides facing respectively in first and second directions longitudinally of the housing, a first valve member mounted centrally with respect to the flange for reciprocation longitudinally of the housing, stop means on the first valve member engaging a portion of the housing when the first valve member lies in its first terminal position, at the end of its movement in the first direction, the first valve member having a central portion which projects into the passage in the flange and directly confronts the wall of the passage with clearance between the central portion of the first valve member and the wall of the passage in the flange to form a fluid conducting opening therebetween, the central portion of the first valve member having an annular end surface which lies exposed at the second side of the flange, a second annular valve member mounted centrally of the flanged wholly beyond the flange in said first direction and confronting the flange, means on the second valve member selectively bridging and making sealing contact with the flange and the said annular end surface of the first valve member and opening the fluid conducting opening therebetween, a central axially directed passage through the second valve member, a central stem attached to the first valve member and slidably projecting axially in said first direction through said central passage in the second valve member, an abutment adjustably mounted on the portion of the stem beyond the second valve member, and a resilient sleeve-like member telescoped about the stem and compressively engaging the abutment and the second valve member at its opposite ends whereby constantly to urge the first valve member toward its first terminal position and the second valve member toward the position in which it closes the passage through the flange, the abutment being free from contact at all times with any fixed part of the housing and the second valve member, and the stem being free at all times from contact with any fixed part of the housing.

3. A two-way relief valve as claimed in claim 2, wherein the resilient sleeve-like member is a coil compression spring, wherein the stem is threaded in the portion thereof beyond the second valve member, and wherein the abutment comprises a nut adjustably secured to the threaded portion of the stem and serving as a seat for the end of the spring beyond the second valve member.

4. A two-way relief valve as defined in claim 3, wherein the stem is provided with an extension beyond the nut, said extension being accessible from the outside of the valve housing, whereby the extension of the stem may be manually moved axially to open the valve against the resilience of the spring to equalize the pressure within opposite end portions of the valve housing.

5. A two-way relief valve as claimed in claim 3, wherein the stop means on the first valve member comprises an extension thereon disposed laterally beyond the central passage in the flange, said extension overlying the flange, and abutting the second side of the flange when the first valve means was in its first terminal position.

6. A two-way relief valve as claimed in claim 3, wherein the means on the second valve member selectively bridging and making sealing contact with the flange and the said annular end surface of the valve member comprises an annular sealing means mounted on the second side of the second valve member and having concentric generally coplanar ribs on the second side thereof, the radially outer one of said ribs being adapted to engage the first side of the flange and the radially inner one of said ribs being adapted to engage the said annular end surface of the first valve member.

7. A two-way relief valve, comprising a housing in the form of a sleeve having a central passage therethrough, the housing having a radially inwardly directed annular flange transverse to the axis of the housing, the flange having a central passage therethrough, the flange having first and second sides facing respectively in first and second directions longitudinally of the housing, a first valve member mounted centrally within the housing for reciprocation longitudinally of the housing, stop means on the first valve member engaging the second side of the flange when the first valve member lies in its first terminal position at the end of its movement in the first direction, the first valve member having a central portion which projects into the passage in the flange and directly confronts the wall of the passage with clearance between the central portion of the first valve member and the wall of the passage in the flange to form a fluid conducting opening therebetween, the central portion of the first valve member having an annular end surface which lies exposed at the second side of the flange, a second annular member mounted centrally within the housing wholly beyond the flange in said second direction and confronting the flange, said second valve member having a diameter substantially greater than the diameter of the central passage through the flange, means on the second valve member selectively bridging and making sealing contact with the flange and the said annular end surface of the first valve member and opening the fluid conducting opening therebetween, a central axially directed passage through the second valve member, a central stem attached to the first valve member and slidably projecting axially in said first direction through said central passage in the second valve member, the stem being threaded, a nut adjustably mounted on the threaded portion of the stem, and a coil compression spring telescoped about the stem and compressively engaging the nut and the second valve member at its opposite ends whereby constantly to urge the first valve member toward its first terminal position and the second valve member toward the position in which it closes the passage through the flange, the nut being free from contact at all times with any fixed part of the housing and the second valve member, and the stem being free at all times from contact with any fixed part of the housing.

References Cited in the file of this patent
UNITED STATES PATENTS

| | | |
|---|---|---|
| 1,229,885 | Chadwick | June 12, 1917 |
| 1,666,935 | Howell | Apr. 24, 1928 |
| 2,841,171 | Baker et al. | July 1, 1958 |
| 3,067,770 | Fancher | Dec. 11, 1962 |